Nov. 6, 1962    F. W. LEHAN ETAL    3,063,048
DISCOVERY AND LOCATION SYSTEM
Filed May 4, 1959    2 Sheets-Sheet 1
Fig. 1b
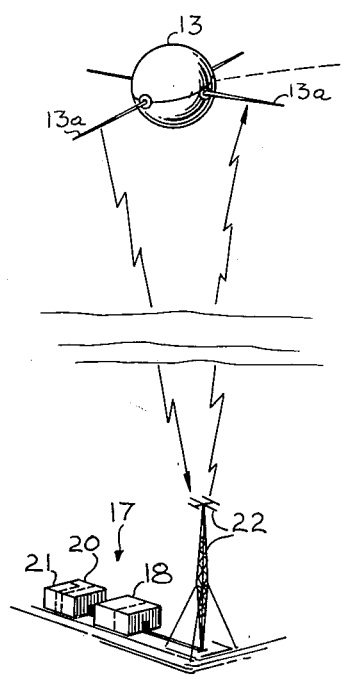
Fig. 1a
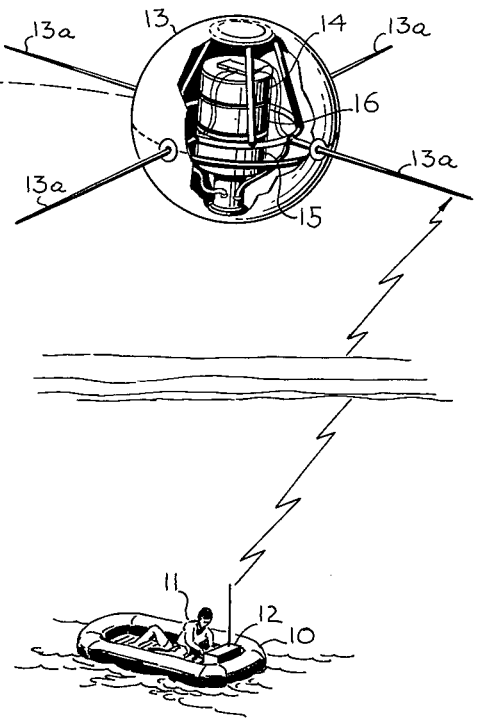
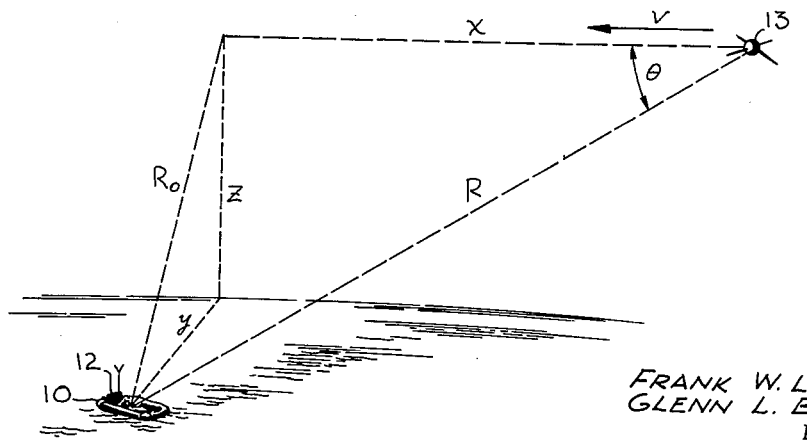
Fig. 2
FRANK W. LEHAN
GLENN L. BROWN
INVENTORS
BY Allen E. Botney
ATTORNEY Nov. 6, 1962
F. W. LEHAN ETAL
3,063,048
DISCOVERY AND LOCATION SYSTEM
Filed May 4, 1959
2 Sheets-Sheet 2
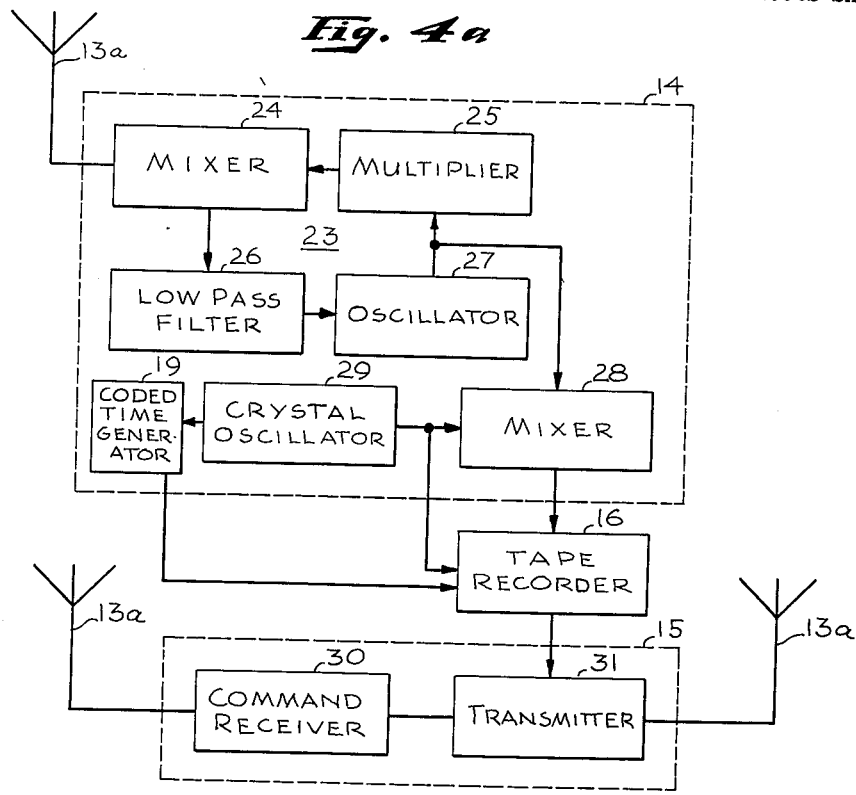
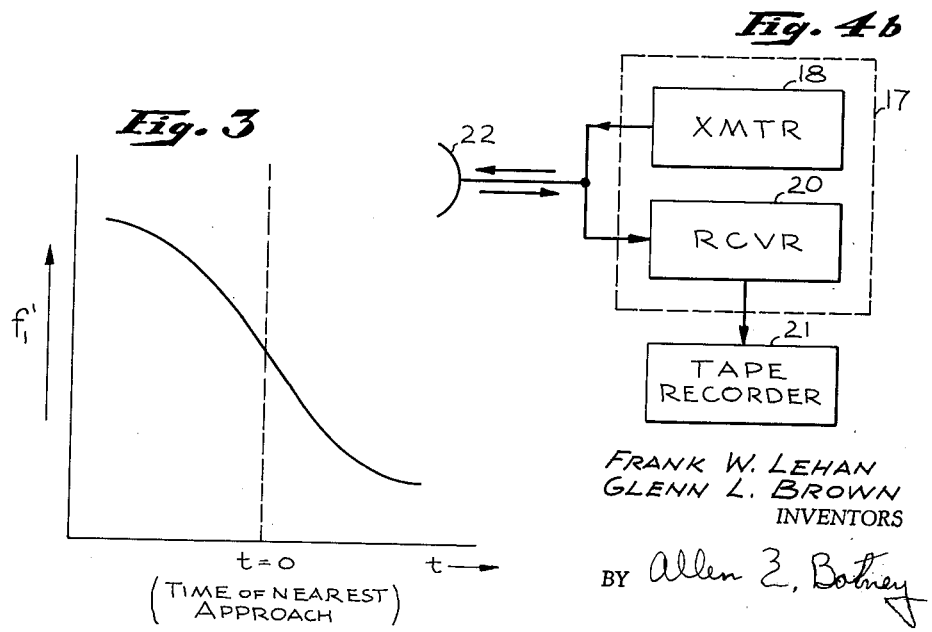
FRANK W. LEHAN
GLENN L. BROWN
INVENTORS
BY Allen E. Bobney
ATTORNEY United States Patent Office 3,063,048
Patented Nov. 6, 1962

3,063,048
DISCOVERY AND LOCATION SYSTEM
Frank W. Lehan, Glendale, and Glenn L. Brown, Los Angeles, Calif., assignors, by mesne assignments, to Space-General Corporation, Glendale, Calif., a corporation of California
Filed May 4, 1959, Ser. No. 810,887
13 Claims. (Cl. 343—112)

The present invention relates in general to discovery and location systems and relates more particularly to a system of the type mentioned that employs Doppler shift principles in conjunction with an orbiting satellite, or a missile or aircraft in flight, to discover and locate an object. The system of the present invention will hereinafter be described in connection with a satellite in orbit. It should be emphasized, however, that such a system may be used with missiles or aircraft as well as with satellites and with equally good effect. Accordingly, the description is not to be construed as limiting the use of the invention solely to satellites.

As is well known, if the survivors of a shipwreck are to be saved from drowning or starvation, their lifeboat or liferaft in which they may be aimlessly wandering the ocean must be quickly discovered and located. Similarly, as often happens, the position of a pilot who has suffered a plane crash or who has had to bail out of his plane must be quickly and accurately determined if his life is to be saved. This need with respect to pilots is becoming evermore commonplace today. Finally, it is occasionally necessary to detect the presence of and thereafter accurately locate objects other than downed airmen or ship's survivors such as, for example, missile capsules or nose cones. In any of the instances mentioned, the feat of initial detection and subsequent accurate location has been a difficult one to accomplish, especially to accomplish it quickly, and various systems have been proposed and used for these purposes. However, none of these earlier systems have been entirely satisfactory in that the installations involved have been complex and expensive and, furthermore, these systems have been limited to relatively small operating ranges and their degree of accuracy leaves something to be desired.

It is, therefore, an object of the present invention to provide a system that will quickly and accurately determine the location of an object to be found.

It is another object of the present invention to provide a discovery and location system of extended operating range.

It is a further object of the present invention to provide a discovery and location system that is of relatively simple construction and relatively inexpensive.

The present invention to a very substantial extent overcomes the above and other deficiencies and limitations of prior art systems by combining Doppler shift phenomena with the motion of a satellite orbiting around the earth. According to the basic concept of the subject invention, the Doppler shift in frequency experienced by a signal transmitted to the satellite by the object being sought is relayed by the satellite to a ground receiver station, the rate of change of frequency being a maximum when the satellite is at its closest point to the object. By determining at what point in the orbital path of the satellite the Doppler shift frequency was changing at a maximum rate, the object is thereby located. More particularly, a signal at a fixed frequency is sent from the object site to the satellite and, as the satellite approaches and recedes from the object site, the frequency of the received signal varies in accordance with Doppler shift principles, the rate at which the frequency of the received signal is changing being a maximum when the satellite is nearest the object. The momentary changes in frequency are recorded together with a timing signal. Both are later transmitted to a ground receiver site whereat reference is made to the point in time at which the rate of frequency shift was a maximum. Since the locus of the satellite is exactly known, its nearest position to the object can be ascertained by noting how much time has elapsed between the receipt of the information at the receiver site and the occasion of maximum rate of Doppler shift.

In one embodiment of the present invention, a transmitter at the site of the object to be located transmits a continuous-wave signal to the satellite and, as the satellite approaches and then recedes, the frequency of the signal received by the satellite continually decreases due to Doppler effect. At one point in time, namely, when the satellite is closest to the object, the frequency of the received signal is decreasing at a maximum rate. In the satellite, a phase-lock loop is used to lock a low and variable frequency oscillator to the incoming signal. The output of the variable-frequency oscillator is then beat against the output of a crystal oscillator to produce an audio beat signal whose frequency varies in the same manner as that of the incoming signal. This audio signal is recorded on tape together with time markers. At a later time, namely, when the satellite approaches the ground receiver station and in response to a command signal transmitted therefrom, the recorded data is passed to a satellite transmitter which transmits it to the ground receiver whereat it is again recorded. The data may then be fed into an appropriate computer or humanly processed for solution.

It will at once be apparent that by making this additional use of satellites that will most assuredly be sent into orbit around the earth in the future, only a single and straight-forward ground installation need be provided, thereby considerably reducing the overall complexity and cost of such equipment. Furthermore, in view of the relatively high speed at which satellites travel through space and in view of the further fact that satellites circle the earth, information concerning the location of the object is quickly obtained at the receiver site and practically every point on the earth's surface is periodically under surveillance. In essence, this means that the range of the receiver installation extends to the four corners of the planet whereas the ranges of previous systems are limited by such factors as curvature of the earth, atmospheric conditions, transmitter power, etc.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURES 1a and 1b broadly illustrate the system of the present invention and the concepts involved;

FIGURES 2 is a geometrical representation useful in illustrating Doppler shift principles involved in the present invention;

FIGURE 3 is a graph illustrating the manner in which the frequency of a signal received by a satellite may vary due to Doppler shift phenomena; and FIGURES 4a and 4b show a block diagram of an embodiment of the present invention.

Referring now to the drawings and in particular to FIGURES 1a and 1b thereof, there is shown in FIGURE 1a a liferaft 10 in which a shipwrecked person or downed airman 11 may be adrift. Accompanying person 11 as a part of his supplies is a transmitter 12 which transmits a continuous-wave signal at a frequency $f_1$. By way of example, the signal frequency may be 200 megacycles per second and the transmitter power may be one (1) milliwatt. Also shown in FIGURE 1a is a satellite structure 13 in an orbital path around the earth, the satellite including as a part of its equipment a receiver 14 electrically coupled to the satellite's antenna array, designated 13a, a transmitter 15 also coupled to the antenna array, and a recorder mechanism 16 connected between the receiver and transmitter.

Satellite 13 is again shown in FIGURE 1b wherein is also shown a ground installation, generally designated 17, which comprises a transmitter and receiver 18 and 20, respectively, and a recorder mechanism 21 connected to the receiver. Both transmitter 18 and receiver 20 are coupled to the same antenna, namely, antenna 22.

Briefly and generally stated, when party 11 turns on transmitter 12, the transmitter commences to transmit a continuous-wave signal at a fixed frequency $f_1$. In due course of time, namely, when satellite 13 approaches the area of craft 10, the satellite intercepts the signal which thereby is received by satellite receiver 14. However, because the satellite first approaches and then recedes from the signal transmitter, the frequency of the signal as received at the satellite continually changes due to Doppler shift phenomena. More specifically, the frequency of the received signal decreases with the passage of time and at one point in time, namely, when satellite 13 is closest to transmitter 12, the rate at which the frequency decreases is a maximum. Since the frequency of the signal transmitted by transmitter 12 has been designated $f_1$, the frequency of the signal as it is received by receiver 14 is designated $f_1'$. As mentioned, frequency $f_1'$ is a variable.

In response to the incoming signal, a corresponding audio signal at frequency $f_a$ is produced by receiver 14, frequency $f_a$ varying in the same manner as frequency $f_1'$. Thus, frequency $f_a$ is also decreasing and, furthermore, decreases at a maximum rate at the same instant as does frequency $f_1'$, that is, at the instant the satellite is nearest to the object. This audio signal is applied to recorder mechanism 16 and, at the same time, a reference or timing signal is also applied to the recorder mechanism. Both signals are recorder and, furthermore, they are recorded continuously. Accordingly, recorder 16 operates continuously and may be of the endless loop type well known in the art in which a closed loop of tape continuously records, this being made possible by placing an "erase" head before the "write" head and thereby periodically erasing the information recorded on each portion of the tape.

After leaving the scene of transmitter 12, that is, the site of the object being sought, satellite 13 at a slightly later time approaches ground installation 17 whereat transmitter 18, receiver 20 and recorder mechanism 21 are located. At the proper instant, a command signal is transmitted from transmitter 18 to satellite 13 for the purpose of activating transmitter 15 therein and, when transmitter 15 is so activated, it transmits a modulated carrier signal down to receiver 20 wherein the signal is demodulated, the modulating signal thereafter being passed to recorder mechanism 21 for recordation. A number of different kinds of modulation, such as amplitude or frequency modulation, or both, may be employed herein, with amplitude modulation being a preferred type. However, other forms of modulation may be used with equally good effect. More specifically, the modulating signal comprises both the audio and timing signals previously recorded on recorder mechanism 16 and the signal carrier is at a frequency $f_2$ which may also be in the order, for example, of 200 megacycles per second. Thus, both the audio signal containing the desired information and the timing signal are recorded by recorder mechanism 21. Since the orbit of satellite 13 and, therefore, the position of the satellite at the time the signal information is received by receiver 20 is exactly known, the exact orbital position of the satellite at the time the rate of Doppler shift was a maximum can also be determined by noting the elapsed time between the two events. More particularly, the elapsed time between the two events mentioned can be determined by referring to the timing signals which, as was previously mentioned, are also recorded by mechanism 16. These timing signals indicate the exact points in time at which the signal information is received at ground receiver 20 and at which the Doppler shift rate is a maximum. The difference between these points in time is the elapsed time referred to above. Since the orbital position of the satellite at the time the information signal is received at the ground site is known, since the entire orbit of the satellite is very accurately known, and since the said elapsed time is known, the orbital position of the satellite at the time the maximum rate of Doppler shift occurred therefore also becomes known. Moreover, once the latter position of the satellite is known, the location of craft 10 can be ascertained with a relatively high degree of accuracy.

The Doppler shift principles involved herein can be clearly illustrated by referring to FIGURE 2 wherein $x$ is the horizontal distance to satellite 13 from the object site at any point in time;
$v$ is the velocity of the satellite relative to the earth;
$R$ is the straight line distance between transmitter 12 and satellite 13 and is equal to $(x^2+R_0^2)^{1/2}$;
$R_0$ is the minimum value of $R$ attained by the satellite; and
$\theta$ is the angle between $R$ and $x$.

The Doppler effect on the signal received at satellite 13 is given by the equation $$f_1' = f_1 \frac{1+v/c \cos \theta}{\sqrt{1-(v/c)^2}} \quad (1)$$

where $f_1$ is the frequency of the signal transmitted by transmitter 12;
$f_1'$ is the frequency of the same signal as it is received at the satellite;
$v$ is the satellite's velocity as heretofore mentioned;
$c$ is the velocity of light; and
$\cos \theta$ is equal to $x/R$.

Equation 1 may be rewritten as $$f_1' = f_1 \frac{1+\beta \cos \theta}{\sqrt{1-\beta^2}} \quad (2)$$

wherein $\beta$ is equal to $v/c$.

Continuing, the time rate of change of $f_1'$ is $$\dot{f}_1' = \frac{\beta f_1'}{\sqrt{2-\beta^2}} \frac{d(\cos \theta)}{dt} \quad (3)$$

Thus, $\dot{f}_1'$ is a maximum when $\theta = \pi/2$, at which time the satellite is at the point of nearest approach, that is, a distance $R_0$ from transmitter 12. Since $\cos \theta = x/R$, Equation 3 may be written as $$\dot{f}_1 = \frac{\beta f_1'}{\sqrt{1-\beta^2}} \frac{d}{dt}\left(\frac{x}{R}\right) \quad (4)$$

Hence, from Equation 4

$$\dot{f}_1 = \frac{\beta f_1'}{\sqrt{1-\beta^2}} \frac{R\frac{dx}{dt} - x\frac{dR}{dt}}{R^2} \quad (5)$$

It will be recognized that $$\frac{dR}{dt} = 0$$

when $\theta = \pi/2$, with the result that Equation 5 reduces to $$f_1 = \frac{\beta f_1'}{\sqrt{1-\beta^2}} \frac{dx/dt}{R_0} \qquad (6)$$

Furthermore, since $$\frac{dx}{dt} = v$$

$$f_1' = \frac{\beta f_1'}{\sqrt{1-\beta^2}} \frac{v}{R_0} \qquad (7)$$

Consequently, solving Equation 7 for $R_0$, we have $$R_0 = \frac{\beta f_1' v}{\sqrt{1-\beta^2}} \left(\frac{1}{f_1'}\right) \theta = \pi/2 \qquad (8)$$

It will thus be seen from Equation 8 that the distance $R_0$ between satellite 13 and transmitter 12 at the former's nearest approach to the latter can be determined if the maximum rate of Doppler shift $f_1'$ is known, and it was previously explained how this value can be found.

A typical plot of the frequency that may be recorded on the satellite as a function of time is shown in FIG. 3 and, as shown, the curve is symmetrical about the point $t=0$, which is the point of nearest approach.

Referring now to FIGS. 4a and 4b, an embodiment of the present invention is shown therein in block form, FIG. 4a showing receiver 14, transmitter 15 and recorder mechanism 16 mounted in satellite 13 and FIG. 4b showing transmitter 18, receiver 20 and recorder mechanism 21 mounted in ground installation 17.

Considering FIG. 4a, receiver 14 comprises a phase-locked oscillator network, generally designated 23, which includes a mixer circuit 24, a frequency multiplier 25, a low-pass filter 26 and a low frequency, variable frequency, oscillator 27. Mixer circuit 24 is connected both to satellite antenna array 13a and to frequency-multiplier circuit 25 to receive signals therefrom. Low-pass filter 26, on the other hand, is connected between the input end of variable-frequency oscillator 27 and the output end of mixer 24, the output end of the oscillator being connected to the input end of the frequency multiplier. Receiver 14 also includes a mixer circuit 28 connected between the output ends of variable-frequency oscillator 27 and a crystal oscillator 29, the output end of the crystal oscillator being connected also to a coded time generator 19 which produces binary coded timing signals. A large number of devices for producing timing signals or markers are presently known and available and any one of these devices may be adapted for use as timing generator 19. One such device is the resettable electronic counter, such as the ring counter, comprising an appropriate number of flip-flop stages connected in tandem. Initially, one of the stages is conducting and all other stages are cut off. When an input pulse is applied to the conducting stage, it is driven to cut-off and the following stage is rendered conductive. This conducting condition advances from one stage to the next with each applied pulse and by clamping certain ones of these stages to different voltage levels, pulses of different amplitudes are periodically produced to respectively indicate different units of time, such as seconds, minutes and hours or any fraction thereof.

Transmitter 15 comprises a command receiver circuit 30 and a transmitter network 31, the command receiver circuit being connected between a first input of the transmitter network and satellite antenna structure 13a. Command receiver circuit 30 operates in response to a signal from the ground to activate transmitter network 31 and, hence, may be any one of a number of well known circuits, such as a recognition circuit, a gating circuit, a threshold circuit, etc. The output end of transmitter network 31 is coupled to antenna arrangement 13a.

Recorder mechanism 16 is preferably a tape recorder having at least two and preferably three recording channels, one channel being coupled to the output of mixer 28, another channel being coupled to the output of crystal oscillator 29 and the third channel being coupled to the output of coded time generator 19. The output end of the tape recorder, on the other hand, is coupled to a second input to transmitter network 31.

Considering FIG. 4b, transmitter and receiver 18 and 20, respectively, may be standard pieces of equipment of this type and both are coupled to antenna 22, the transmitter at its output end and the receiver at its input end. Recorder mechanism 21 is coupled to the output of receiver 20 and is again preferably a tape recorder having at least two channels.

In operation, a signal at fixed frequency $f_1$ is transmitted by transmitter 12 located at the object site. This signal is intercepted by satellite antenna array 13a and, because of Doppler shift effects that were previously explained, a signal at variable frequency $f_1'$ is applied to mixer circuit 24. At the same time, variable-frequency 27 generates a signal whose frequency, at any instant, is substantially $f_1'/N$. The oscillator 27 signal is applied to frequency-multiplier circuit 25 which multiplies the frequency of the signal applied thereto by a factor of N. Consequently, the frequency of the signal out of frequency-multiplier circuit 25 and applied to mixer 24 is substantially $f_1'$ and if any difference in frequency exists between the two signals applied to the mixer, another signal corresponding to the frequency difference is passed through low-pass filter 26 and applied to oscillator 27. This other signal is in the nature of an error signal and has the effect of adjusting the frequency of the signal out of oscillator 27 so that the frequency of the signal out of frequency-multiplier 25 will be equal to $f_1'$. When the frequencies of the two signals applied to mixer 24 are equal, the signal passed through filter 26 to oscillator 27 is reduced to zero and remains zero until the frequency of one of the two above-mentioned signals changes.

In fact, the frequency $f_1'$ of the incoming signal is continually changing, more specifically, decreasing, due to Doppler shift so that an error or correcting signal is applied to oscillator 27 so long as a signal is received at the satellite. As a result, the frequency $f_1'/N$ of the signal produced by oscillator 27 is continually varied in the same manner as the frequency $f_1'$ of the incoming signal. The output of oscillator 27 is applied to mixer circuit 28 to which is also applied the signal output generated by crystal oscillator 29. The frequency of the oscillator 29 signal is fixed at $f_2$ and is of such a value that the difference between frequencies $f_1'/N$ and $f_2$ equals an audio frequency $f_a$. It will be recognized by those skilled in the art that audio frequency $f_a$ also varies in the same manner as frequency $f_1'$. It is thus seen that ultimately an audio signal is produced by mixer 28 whose frequency $f_a$ decreases in the same manner as frequency $f_1'$ of the signal received at the satellite. The audio signal out of mixer 28 is applied to tape recorder 16 where it is recorded in one of the channels thereof. At the same time, the signal out of crystal oscillator 29, generated at frequency $f_2$, is also applied to tape recorder 16 and recorded in a second channel thereof to be used later for wow and flutter compensation. Finally, coded timing signals are periodically produced by time generator 19 and applied to tape recorder 16 for recordation in a third channel thereof. These timing signals are preferably binary coded and are recorded for the purpose of providing a timing reference by which to accurately measure intervals of time.

When satellite 13 is in the vicinity of ground installation 17 as shown in FIG. 1b, a command signal is transmitted to the satellite by transmitter 18. This command signal is intercepted by antenna array 13a and passed to command receiver 30 which, in response thereto, activates or triggers on transmitter network 31. In consequence thereof, the audio, timing and other signals previously recorded by tape recorder 16 are used in transmitter network 31 to modulate a carrier generated therein. The carrier is generated at a frequency $f_3$ that is preferably very much higher than either $f_a$ or $f_2$. The modulated carrier is then transmitted via antennas 13a to ground installation 17 where it is intercepted by antenna 22 and passed to receiver 20. In receiver 20, the received carrier is demodulated to thereby reproduce the audio and other signals which are thereafter recorded by tape recorder 21.

Very clear indication was previously provided that the frequency of the carrier in the modulated signal transmitted to earth is very much larger than that of the modulating audio signal. Now, it is very well known in the art, as witness Equation 1 above, that frequency shift is also a function of signal frequency, which is to say that a signal at a very high frequency will experience very much more of a Doppler shift than a signal having a significantly lower frequency. Hence, the carrier portion of the signal transmitted to earth in response to the command signal experiences all the frequency shift whereas the audio or modulating signal, whose frequency components are insignificant compared to the carrier frequency, experience practically no Doppler shift. Consequently, when the signal received at the ground station is demodulated, the audio signal thereby obtained is substantially identical with the original audio signal, that is, the audio signal obtained at the ground station is, for all practical purposes, unaffected by Doppler shift phenomena and, therefore, accurately reflects the Doppler shifts to which frequency $f_1$ has been subjected.

Reference to the signals as recorded will indicate at what point in time frequency $f_a$ of the audio signal and, therefore, frequency $f_1'$ of the signal received by the satellite, was decreasing at a maximum rate. In other words, the maximum value of $f_1'$ is thus obtained and the point in time at which it occurred. Using the point in time at which the command signal was transmitted as a reference or starting point, the total elapsed time between the two events is easily determined. Since the satellite orbit is exactly known and, furthermore, since the orbital position of the satellite at the time the command signal was given is also known, the orbital position of the satellite at the time of maximum rate of change of frequency $f_1'$ can now be accurately determined. Moreover, since the maximum rate of change of frequency $f_1'$ is now known, that is since the maximum value of $f_1'$ is now known, the distance $R_0$ can now be calculated from Equation 8. It will be remembered that distance $R_0$ is the shortest distance attained between satellite 13 and craft 10. With distance $R_0$ known, the location of the object being sought can now be ascertained.

It should be noted that there are actually two points on the earth's surface at a distance $R_0$ from the satellite. However, prior knowledge concerning the general location of the search object might limit the possibilities to one point or else data from two satellites would uniquely determine the object's position. In any event, the area of both points could be searched and the object found.

Having thus described the invention, what is claimed as new is:

1. A system for use with a structure moving in the space above the earth to discover and determine the location of an object whose position on the earth's surface is unknown, said system comprising: first transmitter means at the object site for transmitting a first radio-frequency signal at a fixed predetermined frequency; first receiver means mounted in the structure for receiving said first signal whose frequency at the structure varies in accordance with Doppler shift principles, said first receiver means being operable in response to said received first signal to produce an audio signal whose frequency varies in the same manner as the frequency of said received first signal, said receiver means including reference means for producing timing signals that accurately mark off intervals of time; first recording means mounted in the structure and coupled to said receiver means for recording said audio signal and said timing signals; second transmitter means mounted in the structure and coupled to said first recording means for transmitting a carrier wave modulated by said recorded audio signal and timing signals to earth in response to a command signal, said second transmitter including activation means for rendering said second transmitter operable in response to a command signal; and a ground installation including third transmitter means for transmitting a command signal to said second transmitter means, whereby said audio signal and said timing signals are transmitted to earth; and second receiver means receptive of said modulated carrier for deriving said audio signal and said timing signals, said audio and timing signals together indicating the point in time at which the shortest distance existed between the object and the structure.

2. A system for use with a structure moving in the space above the earth to discover and determine the location of an object whose position on the earth's surface is unknown, said system comprising: transmitter means at the object site for transmitting an unmodulated first signal at a fixed predetermined frequency to the structure whereat a signal corresponding to said first signal is received whose frequency continually varies due to Doppler shift phenomena; means mounted in the structure for relaying information concerning the variations in frequency of said correspondingly received signal back to earth by transmitting a modulated signal to earth whose modulation contains the information concerning the frequency variation of said received signal.

3. In a system used with a structure moving in the space above the earth to discover and determine the location of an object whose position on the earth's surface is unknown, apparatus comprising: means mounted in the structure for receiving a carrier signal transmitted from the object site at a fixed predetermined frequency, the frequency of said received carrier signal varying in accordance with Doppler shift principles; additional means in the structure coupled to said last-named means and operable in response to said received carrier signal to produce a modulating signal whose frequency varies in accordance with the Doppler shift frequency variations of said received carrier signal, said additional means including activation means operable in response to a triggering signal to transmit back to earth another carrier signal modulated by said modulating signal; and a ground installation for transmitting said triggering signal to the structure and including apparatus for translating the frequency variations of said modulating signal into distances between the structure and the object at different times, the shortest distance between them existing at the point in time when the rate of change of frequency was a maximum.

4. In a system used with a structure moving in the space above the earth to discover and determine the location of an object whose position on the earth's surface is unknown, apparatus comprising: a receiver mounted in the structure for receiving a signal transmitted from the object site at a fixed predetermined radio frequency, the frequency of said received signal varying in accordance with Doppler shift principles, said receiver being operable in response to said received signal to produce an audio signal whose frequency varies in the same manner as said received signal; and a transmitter in the structure coupled to said receiver for receiving said audio signal, said transmitter being operable to transmit to a station on earth a carrier wave modulated by said audio signal.

5. In a system used with a structure moving in the space above the earth to discover and determine the location of an object whose position on the earth's surface is unknown, apparatus comprising: a receiver mounted in the structure for receiving a signal transmitted from the object site at a fixed predetermined frequency, the frequency of said received signal varying in accordance with Doppler shift principles, said receiver being operable in response to said received signal to produce an audio signal whose frequency varies in the same manner as said received signal; means mounted in the structure for generating timing signals that accurately mark off intervals of time; and a transmitter in the structure coupled both to said receiver and said means, said transmitter being operable to transmit a carrier wave modulated by said audio and timing signals.

6. In a system used with a structure moving in the space above the earth to discover and determine the location of an object whose position on the earth's surface is unknown, apparatus comprising: a receiver mounted in the structure for receiving a signal transmitted from the object site at a fixed predetermined frequency, the frequency of said received signal varying in accordance with Doppler shift principles, said receiver being operable in response to said received signal to produce an audio signal whose frequency varies in the same manner as said received signal; means mounted in the structure for generating timing signals that accurately mark off intervals of time; recording means in the structure coupled both to said receiver and said means for respectively recording said audio and timing signals; a transmitter in the structure for transmitting a carrier wave to earth that is modulated by said audio and timing signals, said transmitter being coupled to said recording means for receiving said audio and timing signals; and a ground installation including an earth receiver for receiving said modulated carrier wave and demodulating it to reproduce said audio and timing signals.

7. In a system used with a satellite encircling the earth to discover and determine the location of an object whose position on the earth's surface is unknown, apparatus comprising: a receiver mounted in the satellite for receiving a signal transmitted from the object site at a fixed predetermined frequency, the frequency of said received signal varying in accordance with Doppler shift principles, said receiver including first means operable in response to said received signal to produce an intermediate-frequency signal whose frequency varies in the same manner as the frequency of said received signal, and second means receptive of said intermediate-frequency signal and operable in response thereto to produce an audio signal whose frequency varies in the same manner as that of said received signal; and a transmitter mounted in the satellite and coupled to said second means for receiving said audio signal, said transmitter being operable to transmit a carrier wave to earth modulated by said audio signal.

8. The apparatus defined in claim 7 wherein said first means comprises a mixer circuit, a low-pass filter, a variable-frequency oscillator and a frequency multiplier connected in a closed loop, said mixer circuit being receptive of said received signal and the output signal from said frequency multiplier, said oscillator generating said intermediate-frequency signal, said frequency multiplier being operable in response to said intermediate-frequency signal to substantially produce said received signal, and said mixer and filter circuits being operable in response to said received and output signals to produce a difference-frequency error signal for adjusting said oscillator in such a manner that said error signal tends to become zero.

9. The apparatus defined in claim 7 wherein said second means comprises a crystal oscillator for generating a signal at a fixed predetermined frequency that differs from the frequency of said intermediate-frequency signal by audio-range values, and a mixer circuit coupled to said crystal oscillator and to said first means and operable in response to the signals received therefrom to produce said audio signal.

10. The apparatus defined in claim 7 wherein said first means includes a mixer circuit, a low-pass filter, a variable-frequency oscillator and a frequency multiplier connected in a closed circuit loop, said mixer circuit being receptive of said received signal and the output signal from said frequency multiplier, said oscillator generating said intermediate-frequency signal, said frequency multiplier multiplying the frequency of said intermediate-frequency signal to substantially produce said received signal, and said mixer and filter circuits being operable in response to said received and output signals to produce a difference frequency error signal that is applied to said oscillator for varying the frequency of said intermediate-frequency signal in such a manner that said error signal tends to become reduced to zero; and said second means includes a crystal oscillator for generating a signal at a fixed predetermined frequency that differs from the frequency of said intermediate-frequency signal by audio range values, and a mixer circuit coupled to said crystal and variable-frequency oscillators and operable in response to the signals therefrom to produce said audio signal.

11. In a system used with a satellite encircling the earth to discover and determine the location of an object whose position on the earth's surface is unknown, apparatus comprising: a receiver mounted in the satellite for receiving a signal transmitted from the object site at a fixed predetermined frequency, the frequency of said received signal varying in accordance with Doppler shift principles, said receiver including means operable in response to said received signal to produce an intermediate-frequency signal whose frequency varies in the same manner as the frequency of said received signal, additional means receptive of said intermediate-frequency signal and operable in response thereto to produce an audio signal whose frequency varies in the same manner as that of said received signal, and reference means for producing timing signals that accurately mark off intervals of time; and a transmitter mounted in the satellite and coupled to said additional and reference means for respectively receiving said audio and timing signals, said transmitter being operable to transmit a carrier wave to earth modulated by said audio and timing signals.

12. In a system used with a satellite encircling the earth to discover and determine the location of an object whose position on the earth's surface is unknown, apparatus comprising: a receiver mounted in the satellite for receiving a signal transmitted from the object site at a fixed predetermined frequency, the frequency of said received signal varying in accordance with Doppler shift principles, said receiver including a mixer circuit, a low-pass filter, a variable-frequency oscillator and a frequency multiplier circuit connected in a closed circuit loop, said mixer circuit being receptive of said received signal and the output signal from said frequency-multiplier circuit, said oscillator generating an intermediate-frequency signal whose frequency is substantially the frequency of said received signal divided by N, where N is an integer greater than zero, said frequency-multiplier circuit multiplying the frequency of said intermediate frequency signal N times to substantially produce said received signal, and said mixer and filter circuits being operable in response to said received and multiplier output signals to produce a difference-frequency error signal that is applied to said oscillator for varying the frequency of said intermediate-frequency signal in such a manner that said error signal tends to become reduced to zero, said receiver further including a crystal oscillator for generating a signal at a fixed predetermined frequency that differs from the frequency of said intermediate-frequency signal by audio range values, an additional mixer circuit coupled to said crystal and variable-frequency oscillators and operable in response to the signals therefrom to produce an audio signal whose frequency varies in the same manner as the frequency of said received signal, and a timing generator coupled to said crystal oscillator and operable in response to the signal therefrom to produce timing signals that accurately mark off intervals of time; and a transmitter mounted in the satellite and coupled to said additional mixer circuit and said timing generator, said transmitter being operable to transmit a carrier wave to earth modulated by said audio and timing signals.

13. A system for use with a satellite encircling the earth to discover and determine the location of an object whose position on the earth's surface is unknown, said system comprising: a first transmitter at the object site for transmitting a radio-frequency signal to the satellite at a fixed predetermined frequency; receiver apparatus mounted in the satellite for receiving said radio-frequency signal whose frequency at the satellite varies in accordance with Doppler shift principles, said receiver apparatus including a mixer circuit, a low-pass filter, a variable-frequency oscillator and a frequency multiplier circuit connected in a closed circuit loop, said mixer circuit being receptive of said received signal and the output signal from said frequency-multiplier circuit, said oscillator generating an intermediate-frequency signal whose frequency is substantially the frequency of said received signal divided by N, where N is an integer greater than zero, said frequency-multiplier circuit multiplying the frequency of said intermediate frequency signal N times to substantially produce said received signal, and said mixer and filter circuits being operable in response to said received and multiplier output signals to produce a difference-frequency error signal that is applied to said oscillator for varying the frequency of said intermediate-frequency signal in such a manner that said error signal tends to become reduced to zero, said receiver further including a crystal oscillator for generating a signal at a fixed predetermined frequency that differs from the frequency of said intermediate-frequency signal by audio range values, an additional mixer circuit coupled to said crystal and variable-frequency oscillators and operable in response to the signals therefrom to produce an audio signal whose frequency varies in the same manner as the frequency of said received signal, and a timing generator coupled to said crystal oscillator and operable in response to the signal therefrom to produce timing signals that accurately mark off intervals of time; a tape recorder coupled to said additional mixer circuit and to said timing generator to simultaneously record said audio and timing signals; transmitter apparatus in the satellite coupled to said tape recorder for receiving the audio and timing signals recorded thereon, said transmitter being operable upon activation to transmit a carrier wave to earth that is modulated by said audio and timing signals; a command receiver in the satellite coupled to said transmitter apparatus, said command receiver being operable in response to a command signal transmitted from earth to activate said transmitter apparatus; and an earth installation including a transmitter network for transmitting a command signal to the satellite, a receiver for receiving and demodulating said modulated carrier wave to reproduce said audio and timing signals.

References Cited in the file of this patent

UNITED STATES PATENTS

| | | |
|---|---|---|
| 2,470,787 | Nosker | May 24, 1944 |
| 2,582,971 | Dunmore | Jan. 22, 1952 |

OTHER REFERENCES

Aviation Week, article entitled "Reveal Doppler Tracking for Guided Missiles," Sept. 15, 1947, pp. 28 and 29.

Peterson: Proceedings of the IRE, vol. 45, No. 11, November 1957, pp. 1553 to 1555.